(12) United States Patent
Chen et al.

(10) Patent No.: US 11,775,766 B2
(45) Date of Patent: Oct. 3, 2023

(54) METHOD AND APPARATUS FOR IMPROVING MODEL BASED ON PRE-TRAINED SEMANTIC MODEL

(71) Applicant: BEIJING BAIDU NETCOM SCIENCE AND TECHNOLOGY CO., LTD., Beijing (CN)

(72) Inventors: Xuyi Chen, Beijing (CN); Shiwei Huang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 330 days.

(21) Appl. No.: 17/249,718

(22) Filed: Mar. 10, 2021

(65) Prior Publication Data
US 2021/0397794 A1    Dec. 23, 2021

(30) Foreign Application Priority Data

Jun. 17, 2020    (CN) .......................... 202010555885.7

(51) Int. Cl.
*G06F 40/30* (2020.01)
*G06N 3/08* (2023.01)
*G06N 3/045* (2023.01)

(52) U.S. Cl.
CPC ............. *G06F 40/30* (2020.01); *G06N 3/045* (2023.01); *G06N 3/08* (2013.01)

(58) Field of Classification Search
CPC ..................................................... G06F 40/30
See application file for complete search history.

(56) References Cited

U.S. PATENT DOCUMENTS

| | | | |
|---|---|---|---|
| 11,699,044 B1* | 7/2023 | Allen | G06V 10/82 704/9 |
| 2004/0249809 A1* | 12/2004 | Ramani | G06F 16/5854 |

(Continued)

FOREIGN PATENT DOCUMENTS

| | | |
|---|---|---|
| CN | 107092661 A | 8/2017 |
| CN | 110795939 A | 2/2019 |

(Continued)

OTHER PUBLICATIONS

Xingbo Liu, Xiushan Nie, Model Optimization Boosting Framework for Linear Model Hash Learning, Feb. 10, 2020, IEEE, vol. 29 (Year: 2020).*

(Continued)

*Primary Examiner* — Kevin Ky
(74) *Attorney, Agent, or Firm* — Knobbe, Martens, Olson & Bear LLP

(57) ABSTRACT

Embodiments of a method and an apparatus for improving a model based on a pre-trained semantic model are provided. The method may include: based on the pre-trained semantic model, obtaining an initial improved model, where semantic result information of an input vector is determined in the initial improved model based on a hash search method; and based on a model distillation method, training the initial improved model to obtain an improved model. Some embodiments can obtain the semantic result information of the input vector by performing the hash search method on the input vector, replace the original complex iterative calculation process of a semantic model, and obtain the improved model with few model parameters and high compression ratio.

12 Claims, 6 Drawing Sheets

(56) References Cited

U.S. PATENT DOCUMENTS

| | | | |
|---|---|---|---|
| 2006/0294192 A1* | 12/2006 | Mao | H04L 63/102 |
| | | | 709/213 |
| 2012/0095764 A1* | 4/2012 | Jeon | G10L 15/1822 |
| | | | 704/246 |
| 2016/0328253 A1* | 11/2016 | Majumdar | G06N 3/126 |
| 2018/0137421 A1* | 5/2018 | Takeda | G06N 7/01 |
| 2018/0174579 A1* | 6/2018 | Henry | G06F 40/289 |
| 2019/0034882 A1* | 1/2019 | Saha | G06N 20/00 |
| 2019/0080455 A1 | 3/2019 | Chen et al. | |
| 2019/0253504 A1* | 8/2019 | Wang | H04L 63/1483 |
| 2019/0325308 A1 | 10/2019 | Chung et al. | |
| 2020/0005191 A1 | 1/2020 | Ganti et al. | |
| 2020/0034703 A1 | 1/2020 | Fukuda et al. | |
| 2021/0397794 A1* | 12/2021 | Chen | G06F 40/30 |
| 2022/0004839 A1* | 1/2022 | Chen | G06N 3/088 |
| 2022/0180202 A1* | 6/2022 | Yin | G06F 16/35 |

FOREIGN PATENT DOCUMENTS

| | | | |
|---|---|---|---|
| CN | 109933682 A | 6/2019 |
| CN | 109977250 A | 7/2019 |
| CN | 110059740 A | 7/2019 |
| CN | 110134761 A | 8/2019 |
| CN | 111104482 A | 5/2020 |
| JP | 2008084068 A | 4/2008 |
| JP | 2013206187 A | 10/2013 |
| WO | WO2016/179413 A1 | 11/2016 |
| WO | WO 2018/126213 | 7/2018 |

OTHER PUBLICATIONS

Qiu, Xipeng, et al., "Pre-trained Models for Natural Language Processing: A Survery", School of Computer Science, Fudan University, Shanghai. Mar. 2020. 29 pages.

Gou, Jianping, et al., "Knowledge Distillation: A Survey", Feb. 2020. 30 pages.

Extended European Search Report dated Aug. 13, 2021 for European Patent Application No. 21161686.7. 9 pages.

Hongzhao et al., "A Multi-scale adversarial network semantic segmentation algorithm based on weighted loss function" Computer Applications and Software (2 pages), Jan. 2020, vol. 37 No. 1.

Shi, Lei et al., "Functional Hashing for Compressing Neural Networks", arXiv:1605.06560v1 [cs.LG] May 20, 2016; 10 pages.

\* cited by examiner

METHOD AND APPARATUS FOR IMPROVING MODEL BASED ON PRE-TRAINED SEMANTIC MODEL

CROSS-REFERENCE TO RELATED APPLICATIONS

This application claims the priority of Chinese Patent Application No. 202010555885.7, titled "METHOD AND APPARATUS FOR IMPROVING MODEL BASED ON PRE-TRAINED SEMANTIC MODEL", filed on Jun. 17, 2020, the content of which is incorporated herein by reference in its entirety.

TECHNICAL FIELD

Embodiments of the present disclosure relate to the field of computer technology, in particular, to the technical fields of natural language processing and deep learning, and more in particular, to a method and apparatus for improving a model based on a pre-trained semantic model.

BACKGROUND

The use of pre-trained semantic models is a development trend in the field of natural language processing. However, current pre-trained semantic models are generally overly larger in parameter scale and complex in calculation, which makes them difficult to be deployed in a production environment. Currently, a model distillation technique, a quantitative clipping technique and the like are generally used to compress the models to increase the processing speed of the models.

SUMMARY

The present disclosure provides a method, apparatus, device and storage medium for improving a model based on a pre-trained semantic model.

According to a first aspect, the present disclosure provides a method for improving a model based on a pre-trained semantic model, and the method includes: based on the pre-trained semantic model, obtaining an initial improved model, where semantic result information of an input vector is determined in the initial improved model based on a hash search method; and based on a model distillation method, training the initial improved model to obtain an improved model.

According to a second aspect, the present disclosure provides a method for improving a model based on a pre-trained semantic model, and the apparatus includes: an improvement unit configured to, based on the pre-trained semantic model, obtain an initial improved model, where semantic result information of an input vector is determined in the initial improved model based on a hash search method; and a training unit configured to, based on a model distillation method, train the initial improved model to obtain an improved model.

According to a third aspect, the present disclosure provides an electronic device, the device includes: at least one processor; and a memory communicating with the at least one processor, where the memory stores instructions executable by the at least one processor, and the instructions, when executed by the at least one processor, cause the at least one processor to execute the method according to any implementation of the first aspect.

According to a fourth aspect, the present disclosure provides a non-transitory computer readable storage medium storing computer instructions, where the computer instructions cause a computer to execute the method according to any implementation of the first aspect.

It should be appreciated that the content described in this section is not intended to identify the key or critical features of embodiments of the present disclosure, nor is it intended to limit the scope of the present disclosure. The other features of the present disclosure will become easy to understand through the following description.

BRIEF DESCRIPTION OF THE DRAWINGS

The accompanying drawings are intended to provide a better understanding of the present disclosure and do not constitute a limitation to the present disclosure.

DETAILED DESCRIPTION OF EMBODIMENTS

Example embodiments of the present disclosure are described below in combination with the accompanying drawings, where various details of embodiments of the present disclosure are included to facilitate understanding and should be considered as examples only. Therefore, those of ordinary skill in the art should realize that various changes and modifications may be made to embodiments described herein without departing from the scope and spirit of the present disclosure. Similarly, for clarity and conciseness, descriptions of well-know functions and structures are omitted in the following description.

Figure 1:
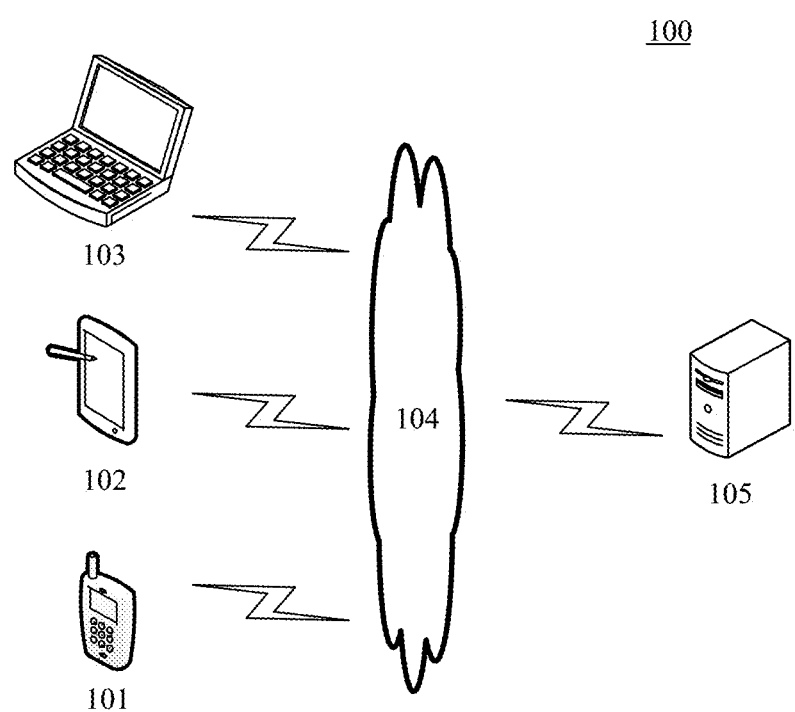
FIG. 1 is an example system architecture diagram in which an embodiment of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

The terminal devices 101, 102 and 103 may be hardware or software supporting network connections for data interaction and data processing. When the terminal devices 101, 102 and 103 are hardware, the terminal devices 101, 102 and 103 may be various electronic devices supporting functions such as information exchange, network connections and information processing, including but not limited to a smart phone, a tablet computer, an electronic book reader, a laptop portable computer, a desktop computer and the like. When the terminal devices 101, 102 and 103 are software, the terminal devices 101, 102 and 103 may be installed in the electronic devices, and may be implemented as multiple software pieces or software modules (such as for providing distributed services), or as a single software piece or software module. It is not specifically limited herein.

The server 105 may be a server providing various services, such as a background processing server improving and training the model based on a pre-trained semantic model sent by the terminal devices 101, 102, 103. The background processing server may obtain an initial improved model based on the pre-trained semantic model and train the initial improved model to obtain an improved model. Alternatively, the background processing server may feedback the improved model to the terminal devices for use by the terminal devices. As an example, the server 105 may be a cloud server.

It should be noted that the server may be hardware or software. When the server is hardware, the server may be implemented as a distributed server cluster composed of multiple servers, or as a single server. When the server is software, the server may be implemented as multiple software pieces or software modules (such as for providing distributed services), or as a single software piece or software module. It is not specifically limited herein.

It should be noted that the method for improving the model based on the pre-trained semantic model provided by embodiments of the present disclosure may be executed by the server or the terminal devices or the server and the terminal devices in cooperation with each other. Correspondingly, parts (such as units, sub-units, modules and sub-modules) included in the information processing apparatus may be all arranged in the terminal devices, or may be arranged in the server and the terminal devices respectively.

It should be appreciated that the number of the terminal devices, the network and the server in FIG. 1 is merely illustrative. Any number of terminal devices, networks and servers may be provided according to actual requirements. When the electronic device adapted to execute the method for improving the model based on the pre-trained semantic model does not require data transmission with other electronic devices, the system architecture may only include the electronic device adapted to execute the method for improving the model based on the pre-trained semantic model (such as the server or the terminal devices).

Figure 2:
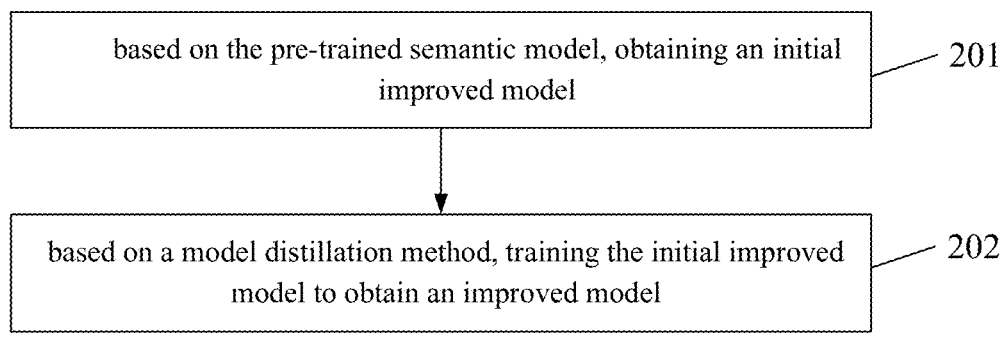
FIG. 2 is a flowchart of an embodiment of a method for improving a model based on a pre-trained semantic model according to the present disclosure.

Further referring to FIG. 2, a flow 200 of an embodiment of the method for improving the model based on the pre-trained semantic model is shown, and the flow 200 includes the following steps 201 to 202.

Step 201 includes based on the pre-trained semantic model, obtaining an initial improved model.

In this embodiment, the execution body of the method for improving the model based on the pre-trained semantic model (such as the terminal devices or the server in FIG. 1) may: obtain the initial improved model based on the pre-trained semantic model, where semantic result information of an input vector is determined in the initial improved model based on a hash search method; and train the initial improved model based on a model distillation method to obtain an improved model.

The pre-trained semantic model is a semantic recognition model obtained by training based on large training data, and is configured to represent a corresponding relationship between a word or a sentence represented by an input vector and a semantic recognition result.

In the field of large-scale machine learning, such as object detection and semantic recognition, a complex large-scale model is often trained in order to obtain good performance. The large-scale model obtained by training determines the semantic recognition result of the input vector through a complex iterative calculation process based on the determined and numerous model parameters. In the model training phase, factors, such as real-time performance and calculation amount, do not need to be considered. However, in the model deployment phase, a small and refined model is easy to deploy, and many factors, such as the size, calculation complexity and speed of the model need to be considered.

Based on the pursuit of small and refined deployment when the model is deployed, the executive body may improve the pre-trained semantic model. For example, the execution body may obtain the semantic result information of the input vector by performing the hash search on the input vector and replace the original complex iterative calculation process of a semantic model with the hash search process. Specifically, the execution body may deploy a hash storage module storing large amount of semantic information. The hash storage module may be deployed together with the improved model, or may be deployed separately, which is not limited herein.

During the semantic information storage process of the hash storage module, the input vector is used as an independent variable, and a corresponding function value (a hash address) is calculated through a certain function relationship (a hash function), and the function value is used as an address of a data element, and the data element is stored in a storage unit of the corresponding address.

Correspondingly, during the semantic information search process of the hash storage module, the input vector is used as an independent variable, and a corresponding function value (a hash address) is calculated through a certain function relationship (a hash function), and semantic information stored in the hash address is used as the semantic result information of the input vector.

In some alternative implementations of this embodiment, during the operation process of the initial improved model, first, the execution body obtains a transformation vector of the input vector based on a fully connected layer; then, according to the hash search method, a target position corresponding to the transformation vector is determined in the hash storage module storing the semantic information, and the semantic information stored in the target position is used as the semantic result information of the input vector.

In this implementation, the vector transformation process and the hash search process of the fully connected layer are used to replace the original complex iterative calculation process of the semantic model, so that the model can be trained with few model parameters and high compression ratio; and compared with the complex iterative calculation process, the vector transformation process and the hash search process of the fully connected layer improve the processing speed of the input vector.

In this embodiment, the initial improved model obtained based on the pre-trained semantic model is an untrained model, and the semantic result information obtained in the above operation process may be erroneous semantic result information, and the initial improved model needs to be trained through subsequent training steps.

Step 202 includes, based on a model distillation method, training the initial improved model to obtain an improved model.

In this embodiment, the execution body may train the initial improved model obtained in step 201 based on the model distillation method to obtain the trained improved model. In the model distillation method, the output result of a preset teacher network model replace true training data to a certain extent to guide the learning of the initial improved model used as a student network model, thereby encouraging the student network model to approximate the input and output vectors of the teacher model.

In some alternative implementations of this embodiment, the execution body uses the pre-trained semantic model as the teacher network model to train the initial improved model used as the student network model to obtain the improved model.

The semantic model used as the teacher network model is a network model that is pre-trained and has good performance. The training of the initial improved model used as the student network model includes two objectives. One is the original objective function, which is the cross entropy between the output result of the initial improved model and the true value of the training data tag, and the other is an improved objective function, which is the cross entropy between the output result of the initial improved model and the output result of the semantic model.

It is generally believed that the improved objective function has a higher entropy, which can provide more information than the original objective function, and therefore, by using the improved objective function, less data and a greater learning rate are used during the training of the initial improved model. As an example, the execution body may use the weight average of the original objective function and the improved objective function as the objective function of the student network model, and the weight of the improved objective function may be larger.

According to the method of the teacher and student network model, the training of the student network model is supervised at a neuron level by using the teacher network model with good performance, and the usage rate of model parameters and the training speed of the improved model are improved.

In some alternative implementations of this embodiment, the pre-trained semantic model is the pre-trained semantic model obtained based on the model distillation method. As an example, a semantic model is a semantic model obtained by model transfer based on a corresponding teacher network model. In this implementation, the pre-trained semantic model has been compressed based on the model distillation method, and on this basis, the semantic model is further improved, thereby further improving the refinement degree of the improved model.

Figure 3:
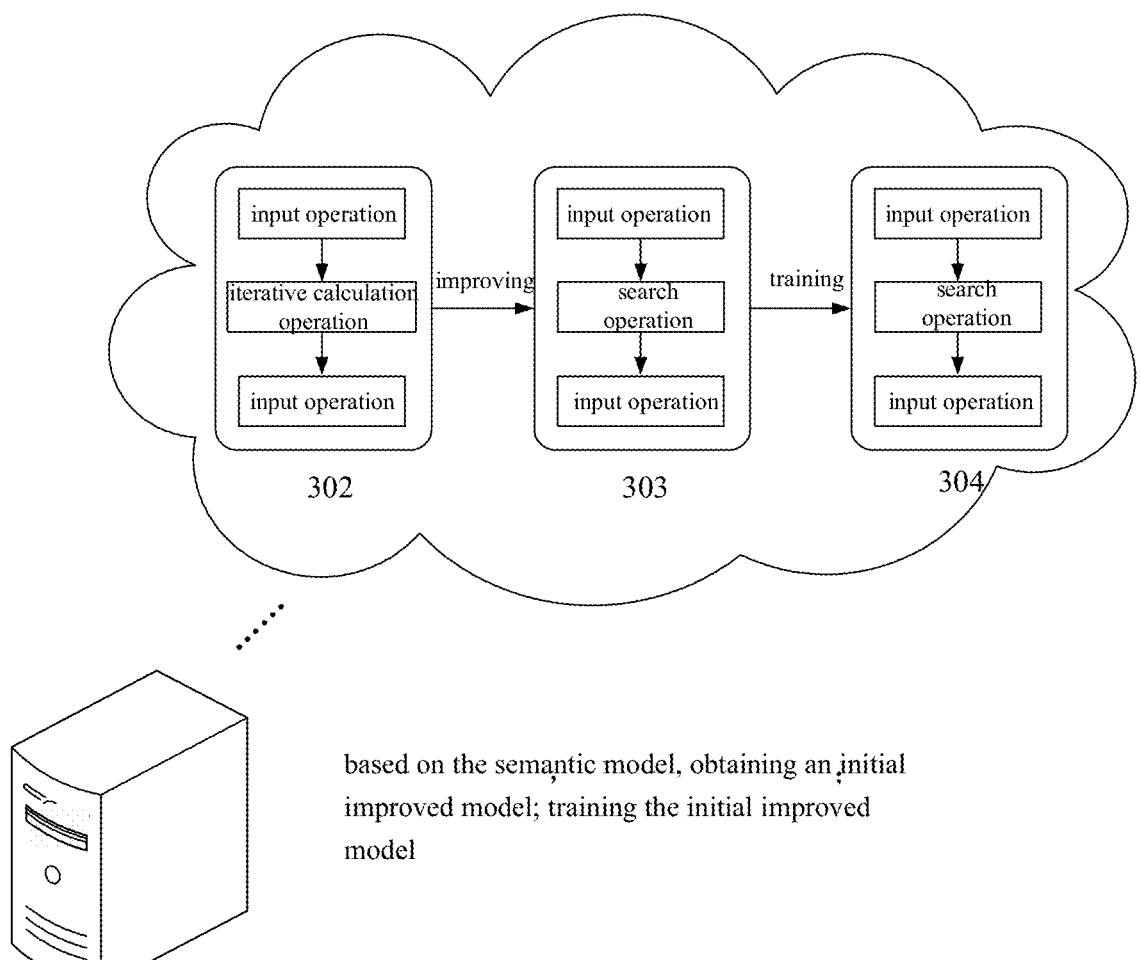
FIG. 3 is a schematic diagram of an application scenario of the method for improving the model based on the pre-trained semantic model according to some embodiments of the present disclosure.

Further referring to FIG. 3, FIG. 3 is a schematic diagram of an application scenario of the method for improving the model based on the pre-trained semantic model according to some embodiments of the present disclosure. In the application scenario of FIG. 3, there is a pre-trained semantic model 302 in the server 301. The operation process of the semantic model 302 includes an input operation, an iterative calculation operation and an output operation. To simplify the semantic model 302, first the server 301 obtains an initial improved model 303 based on the pre-trained semantic model, where the operation process of the initial improved model 303 includes an input operation, a search operation and an output operation, that is, in the initial improved model 303, the semantic result information of the input vector is determined based on the hash search method, and the initial improved model 303 is then trained based on the model distillation method to obtain an improved model 304.

In this embodiment, the semantic result information of the input vector is obtained by performing the hash search method on the input vector, and the original complex iterative calculation process of the semantic model is replaced, and the improved model with few model parameters and high compression ratio is obtained, and the processing speed of the improved model is improved.

Figure 4:
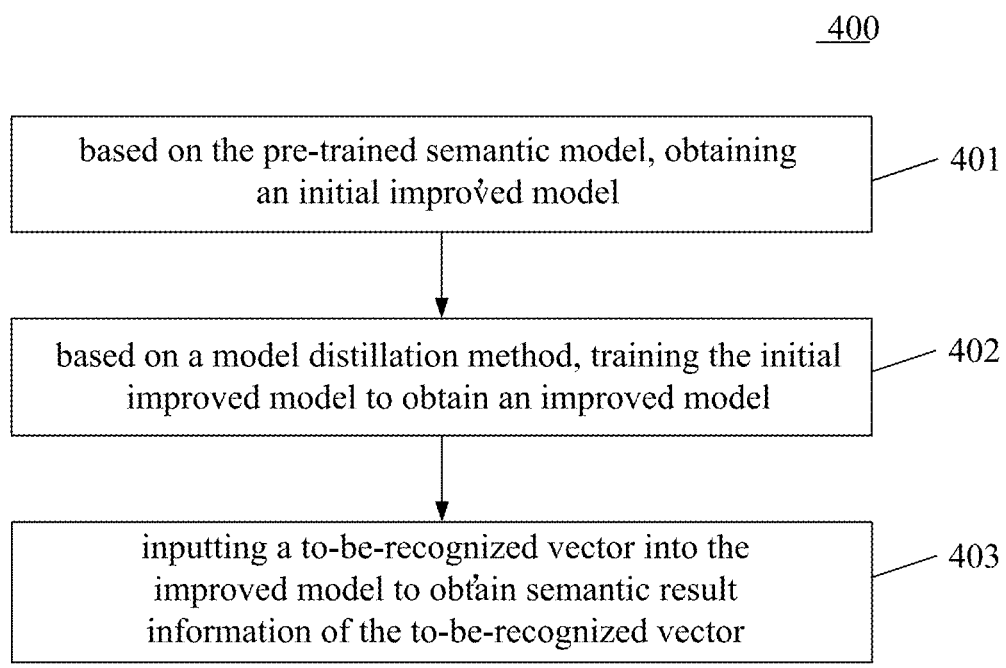
FIG. 4 is a flowchart of another embodiment of the method for improving the model based on the pre-trained semantic model according to the present disclosure.

Further referring to FIG. 4, a flow 400 of another embodiment of the method for improving the model based on the pre-trained semantic model according to some embodiments of the present disclosure is shown, and the flow 400 includes the following steps 401 to 403.

Step 401 includes, based on the pre-trained semantic model, obtaining an initial improved model.

In this embodiment, step 401 is substantially identical to step 201 in the corresponding embodiment of FIG. 2, and details are not described herein.

Step 402 includes, based on a model distillation method, training the initial improved model to obtain an improved model.

In this embodiment, step 402 is substantially identical to step 202 in the corresponding embodiment of FIG. 2, and details are not described herein.

Step 403 includes inputting a to-be-recognized vector into the improved model to obtain semantic result information of the to-be-recognized vector.

In this embodiment, the execution body of the method for improving the model based on the pre-trained semantic model may input the to-be-recognized vector into the trained improved model to obtain the semantic result information of the to-be-recognized vector.

The to-be-recognized vector is used to represent a word, phrase or sentence corresponding to the to-be-recognized vector. The word, phrase or sentence in this embodiment may be any word, phrase or sentence. As an example, the execution body may process an input sentence to obtain the to-be-recognized vector of words or phrases in the sentence.

For the to-be-recognized vector, the execution body first obtains a transformation vector of the input vector based on a fully connected layer in the improved model; then, according to the hash search method, a target position corresponding to the transformation vector is determined in a hash storage module storing semantic information, and the semantic information stored in the target position is used as the semantic result information of the to-be-recognized vector. In this embodiment, the improved model is a trained model, and accurate semantic result information of the to-be-recognized vector can be obtained based on the improved model.

As can be seen from FIG. 4, compared with the corresponding embodiment of FIG. 2, the flow 400 of the method for improving the model based on the pre-trained semantic model in this embodiment inputs the to-be-recognized vector into the improved model to obtain the semantic result information of the to-be-recognized vector. In this case, the solution described in this embodiment can obtain accurate semantic result information according to the to-be-recognized vector, thereby enriching the obtaining ways of semantic information of the to-be-recognized vector.

Figure 5:
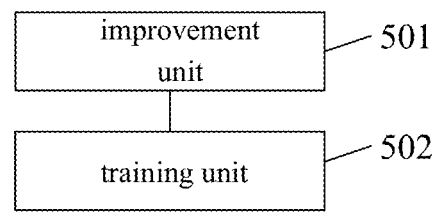
FIG. 5 is schematic structural diagram of an embodiment of an apparatus for improving the model based on the pre-trained semantic model according to the present disclosure.

Further referring to FIG. 5, as an implementation of the method shown in above figures, the present disclosure provides an embodiment of an apparatus for improving the model based on the pre-trained semantic model, which corresponds to the method embodiment shown in FIG. 2. In addition to the features described below, the apparatus embodiment may include the same or corresponding features as the method embodiment shown in FIG. 2, and produce the same or corresponding effects as the method embodiment shown in FIG. 2. The apparatus may be specifically applicable to various electronic devices.

As shown in FIG. 5, the apparatus for improving the model based on the pre-trained semantic model of this embodiment includes: an improvement unit 501 configured to, based on the pre-trained semantic model, obtain an initial improved model, where semantic result information of an input vector is determined in the initial improved model based on a hash search method; and a training unit 502 configured to, based on a model distillation method, train the initial improved model to obtain an improved model.

In some embodiment, the determining semantic result information of an input vector in the initial improved model based on a hash search method includes: based on a fully connected layer, obtaining a transformation vector of the input vector in the initial improved model; and determining a target position corresponding to the transformation vector in a hash storage module storing semantic information according to the hash search method, and using semantic information stored in the target position as the semantic result information of the input vector.

In some embodiments, the pre-trained semantic model is the pre-trained semantic model obtained based on the model distillation method.

In some embodiments, the training unit 502 is further configured to use the semantic model as a teacher network model to train the initial improved model used as a student network model to obtain the improved model.

In some embodiments, the apparatus further includes an operation unit (not shown) configured to input a to-be-recognized vector into the improved model to obtain semantic result information of the to-be-recognized vector.

According to the techniques of some embodiments of the present disclosure, the improvement unit, based on the pre-trained semantic model, obtains the initial improved model, where the semantic result information of the input vector is determined in the initial improved model based on the hash search method, and the training unit, based on the model distillation method, trains the initial improved model to obtain the improved model, such that the semantic result information of the input vector is obtained by performing the hash search method on the input vector, and the original complex iterative calculation process of the semantic model is replaced, and the improved model with few model parameters and high compression ratio is obtained, and the processing speed of the improved model is improved.

According to some embodiments of the present disclosure, the present disclosure further provides an electronic device and a readable storage medium.

Figure 6:
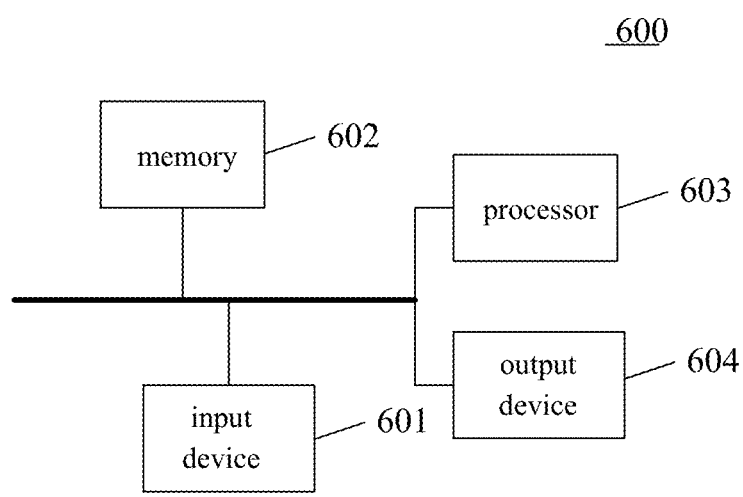
FIG. 6 is a schematic structural diagram of a computer system adapted to implement an electronic device, terminal device or server of some embodiments of the present disclosure.

As shown in FIG. 6, FIG. 6 is a block diagram of an electronic device adapted to execute the method for improving the model based on the pre-trained semantic model according to some embodiments of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 6, the electronic device includes one or more processors 601, a memory 602, and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses and multiple memories may be used with multiple memories, if required. Similarly, multiple electronic devices may be connected (for example, used as a server array, a set of blade servers or a multiprocessor system), and each electronic device provides some of the necessary operations. An example of a processor 601 is shown in FIG. 6.

The memory 602 is a non-transitory computer readable storage medium according to some embodiments the present disclosure. The memory stores instructions executable by at least one processor to cause the at least one processor to execute the method for improving the model based on the pre-trained semantic model according to some embodiments of the present disclosure. The non-transitory computer readable storage medium of some embodiments of the present disclosure stores computer instructions for causing a computer to execute the method for improving the model based on the pre-trained semantic model according to some embodiments of the present disclosure.

As a non-transitory computer readable storage medium, the memory 602 may be used to store non-transitory software programs, non-transitory computer executable programs and modules, such as the program instructions or modules corresponding to the method for improving the model based on the pre-trained semantic model in some embodiments of the present disclosure (such as the improvement unit 501 and the training unit 502 shown in FIG. 5). The processor 601 runs the non-transitory software programs, instructions and modules stored in the memory 602 to execute various functional applications and data processing of the server, thereby implementing the method for improving the model based on the pre-trained semantic model in the method embodiment.

The memory 602 may include a storage program area and a storage data area, where the storage program area may store an operating system and an application program required by at least one function; and the storage data area may store data created by the electronic device when executing the method for improving the model based on the pre-trained semantic model. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for improving the model based on the pre-trained semantic model. Examples of such networks include, but are not limited to, the Internet, enterprise intranets, local area networks, mobile communication networks and combinations thereof.

The electronic device adapted to execute the method for improving the model based on the pre-trained semantic model may further include an input device 603 and an output device 604. The processor 601, the memory 602, the input device 603 and the output device 604 may be interconnected through a bus or other means, and an example of a connection through a bus is shown in FIG. 6.

The input device 603 may receive input number or character information, and generate key signal input related to user settings and functional control of the electronic device adapted to execute the method for improving the model based on the pre-trained semantic model, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN) and the Internet.

The computer system may include a client and a server. The client and the server are generally remote from each other and interact generally through a communication network. The relationship between the client and the server is generated by running the computer programs having a client-server relationship with each other on the corresponding computer.

It should be appreciated that the steps of reordering, adding or deleting may be executed using the various forms shown above. For example, the steps described in some embodiments of the present disclosure may be executed in parallel or sequentially or in a different order, so long as the expected results of the technical solutions provided in some embodiments of the present disclosure may be realized, and no limitation is imposed herein.

The above specific description is not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for improving a model based on a pre-trained semantic model, the method comprising:
   obtaining, based on the pre-trained semantic model, an initial improved model, wherein semantic result information of an input vector is determined in the initial improved model based on a hash search method; and
   training, based on a model distillation method, the initial improved model to obtain an improved model, wherein determining the semantic result information of the input vector in the initial improved model based on the hash search method comprises:
   obtaining, based on a fully connected layer, a transformation vector of the input vector in the initial improved model; and
   determining a target position corresponding to the transformation vector in a hash storage module storing semantic information according to the hash search method, and using semantic information stored in the target position as the semantic result information of the input vector.

2. The method according to claim 1, wherein the pre-trained semantic model is obtained based on the model distillation method.

3. The method according to claim 1, wherein the training, based on a model distillation method, the initial improved model to obtain an improved model, comprises:
   using the semantic model as a teacher network model to train the initial improved model used as a student network model to obtain the improved model.

4. The method according to claim 1, wherein the method further comprises:
   inputting a to-be-recognized vector into the improved model to obtain semantic result information of the to-be-recognized vector.

5. An electronic device, comprising:
at least one processor; and
a memory communicating with the at least one processor, wherein the memory stores instructions executable by the at least one processor, and the instructions, when executed by the at least one processor, cause the at least one processor to perform operations comprising:
obtaining, based on a pre-trained semantic model, an initial improved model, wherein semantic result information of an input vector is determined in the initial improved model based on a hash search method; and
training, based on a model distillation method, the initial improved model to obtain an improved model, wherein determining the semantic result information of the input vector in the initial improved model based on the hash search method comprises:
obtaining, based on a fully connected layer, a transformation vector of the input vector in the initial improved model; and
determining a target position corresponding to the transformation vector in a hash storage module storing semantic information according to the hash search method, and using semantic information stored in the target position as the semantic result information of the input vector.

6. The electronic device according to claim 5, wherein the pre-trained semantic model is obtained based on the model distillation method.

7. The electronic device according to claim 5, wherein the training, based on a model distillation method, the initial improved model to obtain an improved model, comprises:
using the semantic model as a teacher network model to train the initial improved model used as a student network model to obtain the improved model.

8. The electronic device according to claim 5, wherein the operations further comprise:
inputting a to-be-recognized vector into the improved model to obtain semantic result information of the to-be-recognized vector.

9. A non-transitory computer readable storage medium storing computer instructions, wherein the computer instructions, when executed by a computer, cause the computer to perform operations, the operations comprising:
obtaining, based on a pre-trained semantic model, an initial improved model, wherein semantic result information of an input vector is determined in the initial improved model based on a hash search method; and
training, based on a model distillation method, the initial improved model to obtain an improved model, wherein determining the semantic result information of the input vector in the initial improved model based on the hash search method comprises:
obtaining, based on a fully connected layer, a transformation vector of the input vector in the initial improved model; and
determining a target position corresponding to the transformation vector in a hash storage module storing semantic information according to the hash search method, and using semantic information stored in the target position as the semantic result information of the input vector.

10. The storage medium according to claim 9, wherein the pre-trained semantic model is obtained based on the model distillation method.

11. The storage medium according to claim 9, wherein the training, based on a model distillation method, the initial improved model to obtain an improved model, comprises:
using the semantic model as a teacher network model to train the initial improved model used as a student network model to obtain the improved model.

12. The storage medium according to claim 9, wherein the operations further comprise:
inputting a to-be-recognized vector into the improved model to obtain semantic result information of the to-be-recognized vector.

* * * * *